United States Patent [19]
Takakuwa et al.

[11] Patent Number: 5,575,934
[45] Date of Patent: Nov. 19, 1996

[54] WELDER MONITOR

[75] Inventors: Sadayuki Takakuwa, Takatsuki; Yasuhiro Goto, Hyogo-ken, both of Japan

[73] Assignee: Matsushita Electric Industrial Co., Ltd., Osaka-fu, Japan

[21] Appl. No.: 542,629

[22] Filed: Oct. 13, 1995

[30] Foreign Application Priority Data

Oct. 17, 1994 [JP] Japan .................................. 6-250552

[51] Int. Cl.$^6$ ..................................................... B23K 11/25
[52] U.S. Cl. ............................................................ 219/109
[58] Field of Search ..................................... 219/109, 108, 219/110, 117.1

[56] References Cited

U.S. PATENT DOCUMENTS

| | | | |
|---|---|---|---|
| 4,596,917 | 6/1986 | Nied et al. ................................ | 219/109 |
| 5,276,308 | 1/1994 | Hasegawa ................................ | 219/110 |
| 5,343,011 | 8/1994 | Fujii et al. ............................... | 219/109 |
| 5,436,422 | 7/1995 | Nishiwaki et al. ...................... | 219/110 |
| 5,449,877 | 9/1995 | Buda et al. .............................. | 219/110 |

OTHER PUBLICATIONS

"Resistance Welding Phenomenon and its Applications (I)", Resistance Welding Research Commission in the Welding Society, pp. 12–52.

*Primary Examiner*—Clifford C. Shaw
*Attorney, Agent, or Firm*—Wenderoth, Lind & Ponack

[57] ABSTRACT

The welding quality of materials sandwiched between and welded by two electrodes is monitored by a welder monitor, which includes a detecting section for detecting a welding current and a welding voltage, an operation section for numerically analyzing, based on a heat conduction model, a temperature distribution of the two electrodes and that of the materials using the detected welding current and welding voltage, to thereby estimate a nugget diameter during welding, a reference diameter setting section for setting a reference nugget diameter, and a diameter comparing section for comparing the nugget diameter during welding with the reference nugget diameter, to thereby compute a time at which the nugget diameter exceeds the reference nugget diameter. The welder monitor also includes a reference time setting section for setting a reference time shorter than a given time until which welding of intended materials is not terminated, a time comparing section for comparing a nugget formation time, at which the nugget diameter during welding exceeds the reference nugget diameter, with the reference time set by the reference time setting section, and an output section for outputting a comparison result from the time comparing section. When the nugget formation time is shorter than the reference time, the nugget formation time is outputted to the output section.

5 Claims, 6 Drawing Sheets

5,575,934

WELDER MONITOR

BACKGROUND OF THE INVENTION

1. Field of the Invention

The present invention relates to a welder monitor for monitoring the welding quality during resistance welding and, in particular, during spot welding.

2. Description of Related Art

In general, conventional welder monitors cannot judge the time at which electrode chips should be replaced or repaired at a welding site, and welder maintenance is mechanically carried out when the number of welding times reaches a predetermined one. For this reason, the electrode chips being still usable are often replaced with new ones at an earlier stage than necessary, or unnecessary repairs are made.

To overcome these problems, the inventors of this application have proposed a welder monitor as shown in FIG. 7.

In FIG. 7, reference numeral 20 denotes a detecting section for detecting a welding current and a welding voltage. The detecting section 20 detects welding current signals using a toroidal coil 29 mounted on an electrode 27 and measures the welding current by integration of such welding current signals. The detecting section 20 also measures a welding voltage applied between two electrodes 27 and 28 using associated voltage detection lines 30 connected thereto. Reference numeral 21 denotes an operation section for estimating the diameter of a growing nugget based on a temperature distribution of materials 31 to be welded and that of each electrode 27 and 28, both of which are estimated for each unit time. Upon receipt of measurement results from the detecting section 20, the estimation of the temperature distribution is carried out by a numerically-computing simulator based on a heat conduction model. A numerically-computing simulator for numerically computing, based on a heat conduction model, a temperature distribution and a diameter within which electricity flows using measured welding current and welding voltage is disclosed, for example, on pages 12 to 52 of "Resistance Welding Phenomenon and its applications (I)" edited by a resistance welding research commission in the Welding Society.

Reference numeral 22 denotes a reference diameter setting section for setting the nugget diameter to be used as a reference value. Reference numeral 23 denotes a nugget diameter comparing section for comparing the estimated nugget diameter computed by the operation section 21 with the set nugget diameter set by the reference diameter setting section 22, to thereby compute the time at which the estimated nugget diameter exceeds the set nugget diameter (this time is hereinafter referred to as an estimated nugget formation time). Reference numeral 24 denotes a reference time setting section for setting the nugget formation time to be used as a reference time. Reference numeral 25 denotes a time comparing section for comparing the estimated nugget formation time computed by the nugget diameter comparing section 23 with the nugget formation time set by the reference time setting section 24. Reference numeral 26 denotes an output section for outputting a comparison result obtained by the time comparing section 25.

With the above-described construction, based on the welding current and welding voltage detected by the detecting section 20, the operation section 21 computes the estimated nugget diameter using the numerically-computing simulator. Then, the nugget diameter comparing section 23 compares the estimated nugget diameter with the set nugget diameter (reference diameter), thereby computing the estimated nugget formation time. The time comparing section 25 compares the estimated nugget formation time with the set nugget formation time (reference time), and a comparison result is outputted from the output section 26.

The welder monitor referred to above makes use of the fact that the nugget formation time becomes gradually longer with damage of the electrodes 27 and 28, and estimates this time using the heat conduction model. By comparing the estimated nugget formation time with the set reference one, the welder monitor informs an operator of the maintenance time at which the welding conditions should be reset or the electrode chips should be replaced or repaired.

FIG. 8 depicts a graph indicating a relationship between the weld time and the estimated nugget diameter. As shown therein, if an object to be welded having a thickness less than a predetermined one is erroneously fed to the welding site for some reason, the estimated nugget formation time is shifted to the side shorter in the weld time. In this case, even if the electrodes 27 and 28 are damaged, the welder monitor cannot inform the operator of the appropriate maintenance time or the necessity of resetting the welding conditions.

Furthermore, even if erroneous detection or abnormal welding occurs, the welder monitor is likely to erroneously judge that the maintenance time has come.

SUMMARY OF THE INVENTION

The present invention has been developed to overcome the above-described disadvantages.

It is accordingly an objective of the present invention to provide an improved welder monitor capable of accurately informing the operator of the maintenance time for the resetting of the welding conditions, replacement or repairs of the electrode chips, or the like.

In accomplishing the above and other objectives, the welder monitor of the present invention comprises a detection means for detecting a welding current flowing between two electrodes and a welding voltage applied between the two electrodes, an operation means for numerically analyzing, based on a heat conduction model, a temperature distribution of the two electrodes and that of the materials using the welding current and welding voltage both detected by the detection means, to thereby estimate a nugget diameter during welding, a reference diameter setting means for setting a reference nugget diameter, and a diameter comparing megs for comparing the nugget diameter during welding with the reference nugget diameter, to thereby compute a time at which the nugget diameter exceeds the reference nugget diameter. The welder monitor of the present invention further comprises a reference time setting means for setting a reference time shorter than a given time until which welding of intended materials is not terminated, a time comparing means for comparing a nugget formation time, at which the nugget diameter during welding exceeds the reference nugget diameter, with the reference time set by the reference time setting means, and an output means for outputting a comparison result from the time comparing means.

By the above-described construction, when the nugget formation time is shorter than the reference time, the nugget formation time is outputted to the output means. If the materials to be welded have a thickness less than the intended ones, an operator is informed of the proper maintenance time or the necessity of resetting the welding conditions in the presence of the reference time set by the reference time setting means.

In another form of the present invention, the welder monitor comprises a detection means for detecting a welding current flowing between the two electrodes and a welding voltage applied between the two electrodes, an operation means for numerically analyzing, based on a heat conduction model, a temperature distribution of the two electrodes and that of the materials using the welding current and welding voltage both detected by the detection means, to thereby estimate a nugget diameter during welding, a reference diameter setting means for setting a reference nugget diameter, and a diameter comparing means for comparing the nugget diameter during welding with the reference nugget diameter, to thereby compute a time at which the nugget diameter exceeds the reference nugget diameter. The diameter comparing means comprises a storage means for storing a plurality of times at which the nugget diameter has exceeded the reference nugget diameter, and an average value computing means for computing an average value of the plurality of times stored in the storage means. The welder monitor also comprises a reference time setting means for setting a reference time, a time comparing means for comparing the average value computed by the average value computing means with the reference time set by the reference time setting means, and an output means for outputting a comparison result from the time comparing means.

By the above-described construction, even if an erroneous detection occurs during welding at a specific location, or abnormality occurs at only one location, the use of the average value makes it possible to accurately inform the operator of the maintenance time.

In a further form of the present invention, the welder monitor comprises a detection means for detecting a welding current flowing between the two electrodes and a welding voltage applied between the two electrodes, an operation means for numerically analyzing, based on a heat conduction model, a temperature distribution of the two electrodes and that of the materials using the welding current and welding voltage both detected by the detection means, to thereby estimate a nugget diameter during welding, a reference diameter setting means for setting a reference nugget diameter, and a diameter comparing means for comparing the nugget diameter during welding with the reference nugget diameter, to thereby compute a tinge at which the nugget diameter exceeds the reference nugget diameter. The welder monitor also comprises a counter means for counting the number of welding times and an output means for outputting at least one of the time computed by the diameter comparing means and the number of welding times counted by the counter means.

By this construction, the operator is informed of the proper maintenance time by outputting the number of welding times from the output means.

Advantageously, the welder monitor further comprises a reference number setting means for setting a reference number used for comparison with the number of welding times, and a number comparing means for comparing the number of welding times counted by the counter means with the reference number set by the reference number setting means, to thereby compute a time at which the number of welding times counted by the counter means exceeds the reference number. In this case, the output means further outputs a result of computation from the number comparing means.

By comparing the number of welding times with the reference number set by the reference number setting means, the maintenance time can be judged more accurately.

Alternatively, the welder monitor further comprises a reference time setting means for setting a reference time and a time comparing means for comparing a nugget formation time, at which the nugget diameter during welding exceeds the reference nugget diameter, with the reference time set by the reference time setting means, wherein the output means further outputs a comparison result from the time comparing means.

BRIEF DESCRIPTION OF THE DRAWINGS

The above and other objectives and features of the present invention will become more apparent from the following description of preferred embodiments thereof with reference to the accompanying drawings, throughout which like parts are designated by like reference numerals, and wherein.

DETAILED DESCRIPTION OF THE PREFERRED EMBODIMENTS

Figure 1:
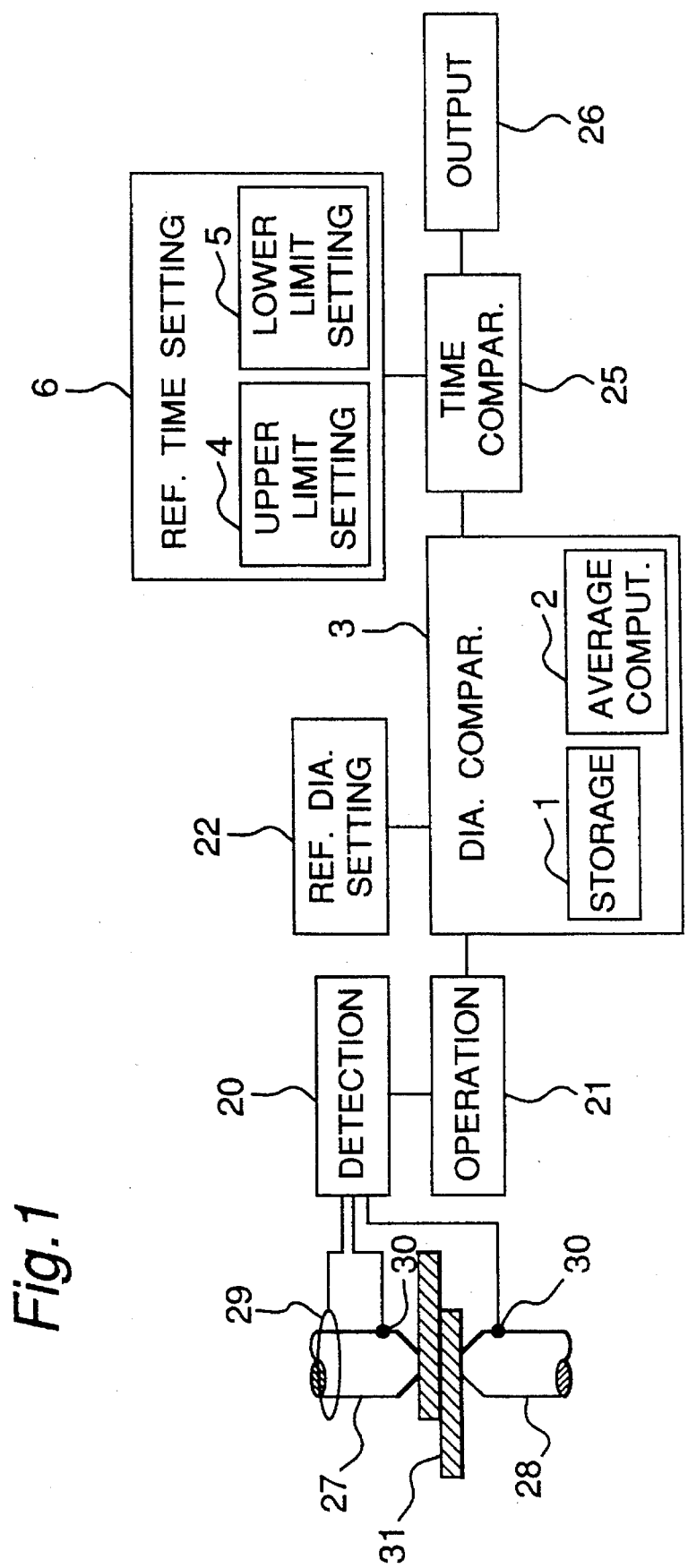
FIG. 1 is a block diagram of a welder monitor according to a first embodiment of the present invention.

Referring now to the drawings, there is shown in FIG. 1 a block diagram of a welder monitor according to a first embodiment of the present invention.

The welder monitor comprises a detecting section 20 for detecting a welding current flowing between two electrodes 27 and 28 and a welding voltage applied between the two electrodes 27 and 28, an operation section 21 for estimating a nugget diameter, and a reference diameter setting section 22 for setting a reference nugget diameter. The welder monitor also comprises a nugget diameter comparing section 3, a reference time setting section 6, and a time comparing section 25, all of which are hereinafter discussed.

The nugget diameter comparing section 3 includes a storage section 1 for comparing the estimated nugget diameter computed by the operation section 21 with the reference nugget diameter set by the reference diameter setting section 22, for computing an estimated nugget formation time at which the estimated nugget diameter exceeds the reference nugget diameter, and for storing the estimated nugget formation time. The nugget diameter comparing section 3 also includes an average value computing section 2 for computing an average value of a plurality of estimated nugget formation times stored in the storage section 1.

The reference time setting section 6 includes an upper limit setting section 4 for setting an upper limit of the reference nugget formation time, and a lower limit setting section 5 for setting a lower limit of the reference nugget formation time. The upper time limit is shorter than the shortest nugget formation time in the ordinary welding for intended materials. The nugget formation time takes the shortest value immediately after replacement of the electrodes 27 and 28, and becomes longer with damage of the electrodes 27 and 28. Accordingly, the upper nugget formation time is set so as to be shorter than at least the nugget formation time immediately after replacement of the electrodes 27 and 28. The lower time limit is a time used to judge the maintenance time for replacement or repairs of the electrodes 27 and 28 due to damage thereof, and is set so as to be substantially equal to the reference nugget formation time set by the reference time setting section 24 provided in the conventional welder monitor.

In the construction shown in FIG. 1, when the materials 31 to be welded are sandwiched between the two electrodes 27 and 28, a power source (not shown) supplies the materials 31 with electricity via the electrodes 27 and 28. After the starting of power supply, the detecting section 20 detects the welding current and the welding voltage applied between the two electrodes 27 and 28 at predetermined time intervals. The welding current is measured by integration of signals detected by a toroidal coil 29 mounted on the electrode 27, while the welding voltage is measured using two voltage detection lines 30 connected to associated electrodes 27 and 28.

The measured welding current and voltage are inputted to the operation section 21, which in turn estimates a temperature distribution of the materials 31 and that of each electrode 27 and 28 for each unit time with reference to various data in association with the thickness, quality, and the number of stack of the materials to be welded, and the electrode configuration, all of which are inputted in advance. The estimation of the temperature distribution is carried out using a numerically-computing simulator which operates in accordance with a flow-chart shown in FIG. 2.

Figure 2:
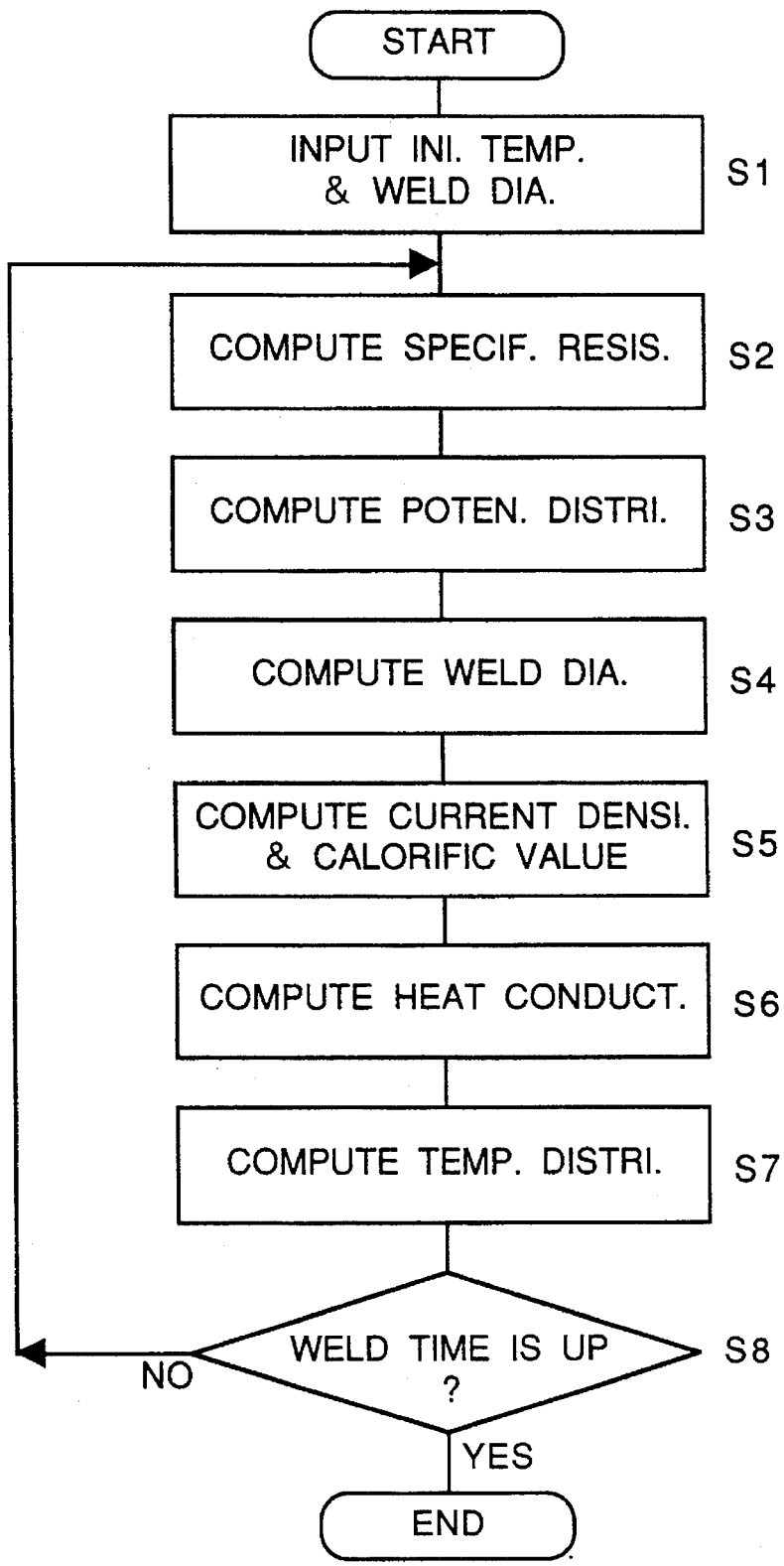
FIG. 2 is a flow-chart indicating a method of numerically analyzing a heat conduction model used in the welder monitor of FIG. 1.

In the flow-chart of FIG. 2, the initial temperature of the materials 31 to be welded is inputted to the operation section 21. The initial diameter within which electricity flows across the materials 31 is determined based on the thickness and quality of the materials 31 and the electrode configuration, and is then inputted to the operation section 21 (step S1). The diameter within which electricity flows across the materials 31 is hereinafter referred to as the weld diameter.

The specific resistance of the materials 31 is computed from the initial temperature of the materials 31 (step S2), and the potential distribution within the materials 31 is computed based on the initial weld diameter and the computed specific resistance of the materials 31 (step S3). Then, the computed potential is compared with the welding voltage detected by the detecting section 20, and the weld diameter is computed so that the computed potential may be in match with the detected welding voltage (step S4).

Thereafter, the current density is computed from the computed potential, and the current value is computed from the current density. The calorific value is then computed based on the current value and the specific resistance of the materials 31, both of which have been already computed (step S5).

Furthermore, the heat conductivity is computed from the computed calorific value (step S6), and the temperature distribution is computed using the computed heat conductivity (step S7). The nugget diameter is estimated based on this temperature distribution. More specifically, upon completion of estimation of the temperature distribution, that portion of the estimated temperature distribution which exceeds the set melt temperature of the materials 31 is regarded as an estimated nugget.

The steps S2 to S7 are repeated until the weld time is up (step S8).

Figure 3:
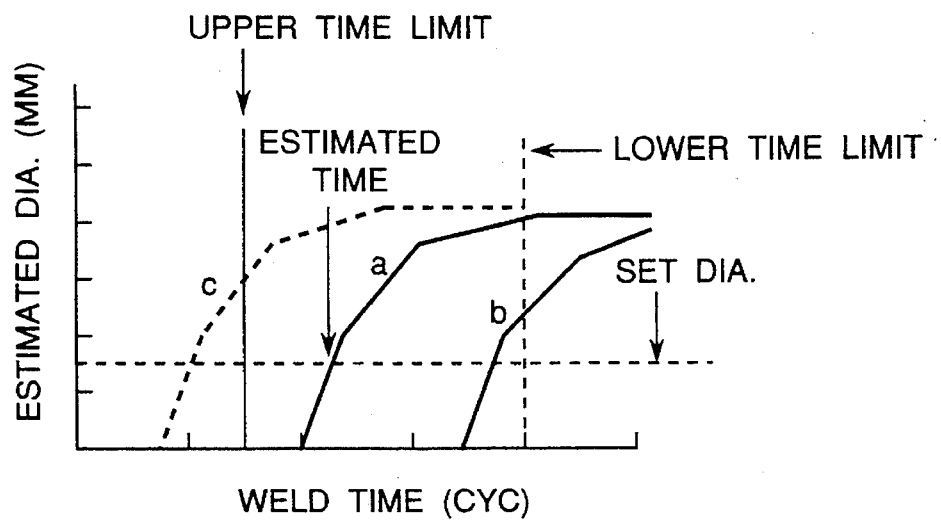
FIG. 3 is a graph indicating a relationship between the estimated nugget diameter and the weld time.

FIG. 3 depicts a graph indicating a relationship between the weld time and the diameter of the estimated nugget. As shown therein, the lower limit of the nugget formation time is set constant. For this reason, if the nugget formation is started in the first half of the weld time, as shown by a solid line (a) in FIG. 3, the nugget is later saturated satisfactorily and, hence, the constant lower limit makes the welding stable. In contrast, if the nugget formation is started in the latter half of the weld time, as shown by a solid line (b) in FIG. 3, the constant lower limit makes the welding unstable and varies the final estimated nugget diameter with a change of other conditions.

Immediately after replacement of the electrodes 27 and 28, the weld time generally represents a curve as shown by the solid line (a) in FIG. 3, and the lower limit of the nugget formation time is generally set in accordance therewith. Because the estimated nugget formation time is shifted towards the solid line (b) with damage of the electrodes 27 and 28, the extent to which the electrodes 27 and 28 are damaged can be known by observing the estimated nugget formation time.

If the nugget formation is started at the beginning of the weld time, as shown by a dotted line (c), the materials 31 to be welded are being supplied with electricity till the lower limit of the nugget formation time even after a desired nugget has been formed, resulting in an unnecessary power supply, which is likely to generate a so-called expulsion or cause erroneous welding. The expulsion is a phenomenon which frequently takes place, for example, when at least one of the actual materials 31 has a thickness less than that of an intended material.

In the nugget diameter comparing section 3, the estimated nugget diameter computed by the operation section 21 is compared with the reference nugget diameter set in advance by the reference diameter setting section 22 for computation of the estimated nugget formation time. The nugget diameter comparing section 3 determines that the estimated nugget formation time has been reached when the estimated nugget diameter has exceeded the reference nugget diameter.

The storage section 1 stores a plurality of estimated nugget formation times obtained so far, while the average value computing section 2 computes an average value of some of the plurality of estimated nugget formation times. For example, the average value computing section 2 may compute an average value of the nugget formation time estimated at the latest welding and that estimated at the welding immediately before it, or may compute an average value of the nugget formation times estimated at the last four welding. However, the number of welding times used for computation of the average value is not limited to two or four.

The average value computed by the average value computing section 2 in the above-described manner is inputted to the time comparing section 25, which in turn compares it with the reference nugget formation time set by the reference time setting section 6. The comparison result is inputted to the output section 26. In the reference time setting section 6, the upper limit setting section 4 sets the shortest nugget formation time as an upper limit, while the lower limit setting section 5 sets the longest nugget formation time as a lower limit, the longest nugget formation time being a time immediately before the electrodes 27 and 28 are damaged to the extent of being unusable and, hence, replacement thereof is required. As a matter of course, the nugget formation time set by the lower limit setting section 5 is longer than that set by the upper limit setting section 4. The reason why the section for setting the shortest nugget formation time is referred to as the upper limit setting section 4, and the section for setting the longest nugget formation time is referred to as the lower limit setting section 5 is that the time at which the electrodes 27 and 28 are little damaged is regarded as the upper limit, while the time at which they are considerably damaged is regarded as the lower limit.

Where the average value of the estimated nugget formation times is less than the value set by the upper limit setting section 4, or greater than the value set by the lower limit setting section 5, the time comparing section 25 informs the output section 26 of the necessity of welder maintenance.

As described hereinabove, according to the first embodiment of the present invention, even if an erroneous detection occurs during welding at a specific location, or abnormality occurs at only one location, the use of the average value makes it possible to accurately inform the operator of the maintenance time. Furthermore, because the operator can recognize a change with time associated with deterioration of the electrodes 27 and 28, he can easily judge the maintenance time for the resetting of the welding conditions, replacement or repairs of the electrodes, or the like.

In addition, in the presence of the upper limit of the nugget formation time set by the upper limit setting section 4, if the thickness of materials to be welded is less than that of the intended materials, the operator is informed of the necessity of welder maintenance or of resetting the welding conditions.

It is to be noted here that in place of the average value of the estimated nugget formation times, a reference value may be derived from approximation processing following a regression analysis of the estimated nugget formation times. Alternatively, the necessity of welder maintenance may be judged based on analytic processing with respect to arbitrary data in which a predetermined number of estimated nugget formation times out of the permissible range are confirmed.

Figure 4:
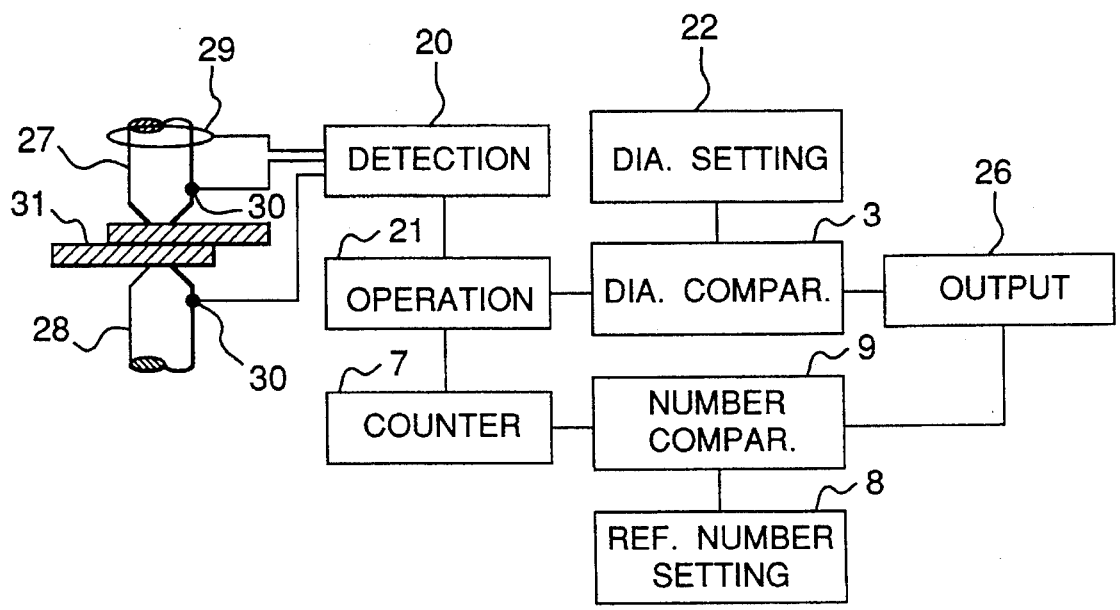
FIG. 4 is a block diagram of a welder monitor according to a second embodiment of the present invention.

FIG. 4 depicts a welder monitor according to a second embodiment of the present invention.

As is the case with the welder monitor of FIG. 1, the welder monitor of FIG. 4 comprises a detecting section 20, an operation section 21, a reference diameter setting section 22, a nugget diameter comparing section 3, and an output section 26, all of which have been discussed above. The welder monitor of FIG. 4 further comprises a counter section 7 for first detecting a start signal sent from a welder controller (not shown) and for subsequently counting the number of welding times, a reference number setting section 8 for setting a reference number used for comparison with the number of welding times, and a number comparing section 9 for comparing the number of welding times counted by the counter section 7 with the reference number set by the reference number setting section 8 and for subsequently outputting the comparison result to the output section 26. As is the case with the conventional management using the reference number of welding times, the reference number referred to above can be arbitrarily set by the operator according to various welding conditions.

It is to be noted that the reference time setting section 6 (including the upper limit setting section 4 and the lower limit setting section 5) and the time comparing section 25, both employed in the welder monitor shown in FIG. 1, may be provided in the welder monitor shown in FIG. 4.

It is also to be noted that the nugget diameter comparing section 3 may be provided with the storage section 1 and the average value computing section 2, like the welder monitor shown in FIG. 1.

Figures 5, 6:
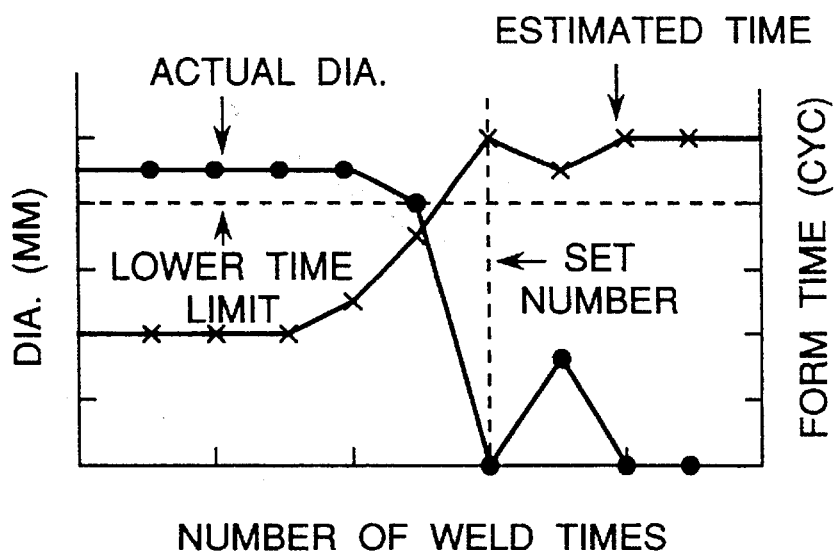
FIG. 5 is a graph indicating a first relationship of the estimated nugget formation time and actual measurements of the nugget diameter relative to the number of welding times.
FIG. 6 is a graph similar to FIG. 5, but indicating a second relationship of the estimated nugget formation time and actual measurements of the nugget diameter relative to the number of welding times.
Figure 7:
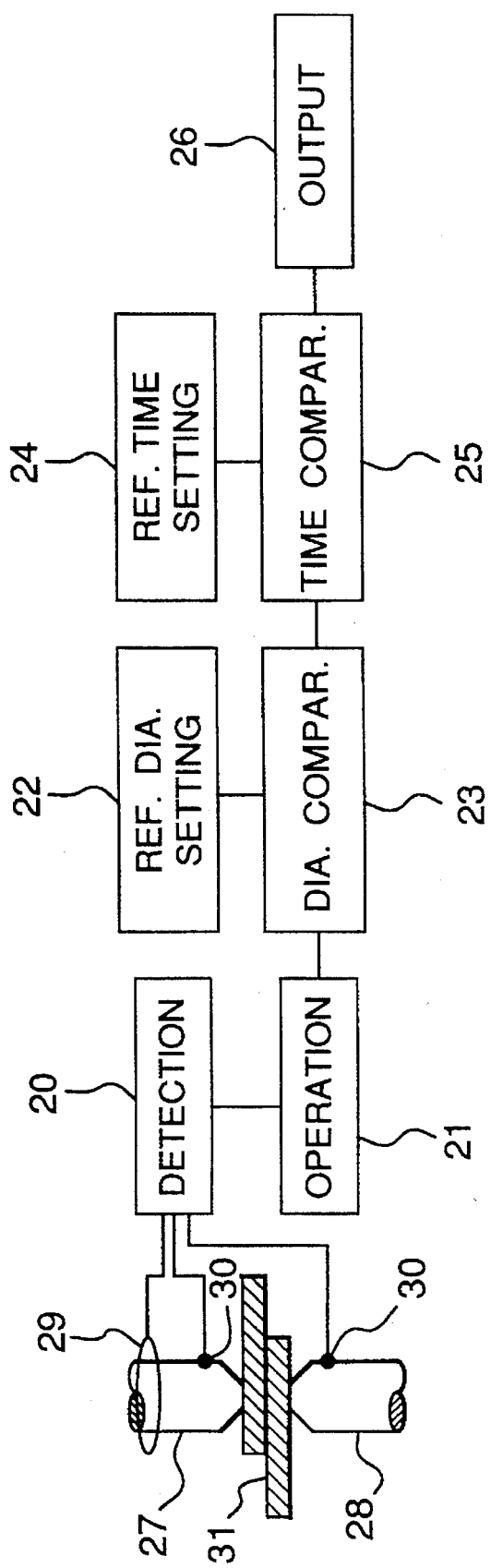
FIG. 7 is a block diagram of a conventional welder monitor.
Figure 8:
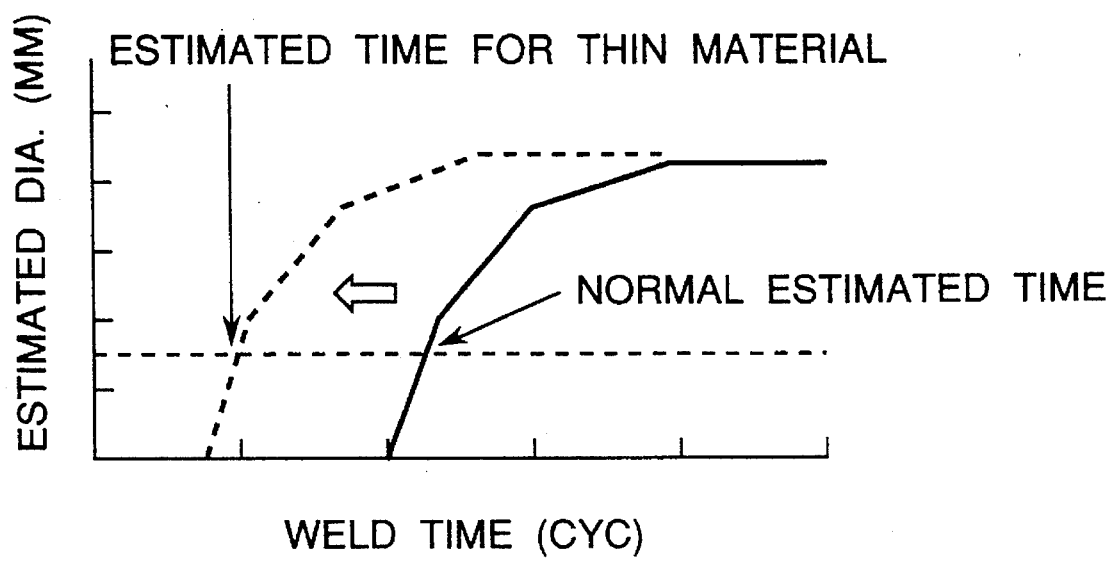
FIG. 8 is a graph indicating a relationship between the estimated nugget diameter and the weld time when the conventional welder monitor of FIG. 7 is used.

By the above-described construction, the comparison result of the estimated nugget formation time with the set reference time, and the comparison result of the number of welding times counted by the counter section 7 with the set reference number are both outputted from the output section 26. By so doing, as shown in FIG. 5 indicating a first relationship of the estimated nugget formation time and actual measurements of the nugget diameter relative to the number of welding times, if the estimated nugget formation time exceeds the set reference time (lower time limit) before the number of welding times reaches the reference number, the operator is informed of, when the estimated nugget formation time has exceeded the lower time limit, the necessity of resetting the welding conditions or the necessity of replacement or repairs of electrodes. On the other hand, as shown in FIG. 6 indicating a second relationship of the estimated nugget formation time and actual measurements of the nugget diameter relative to the number of welding times, if the number of welding times reaches the reference number before the estimated nugget formation time exceeds the lower time limit, the operator is informed of such necessities, when the number of welding times has reached the reference number.

Accordingly, it becomes possible to manage the maintenance time based on both the heat conduction model and the reference number of welding times, resulting in a proper judgement of the maintenance time.

In FIGS. 5 and 6, because the weld time is set constant, damage of the electrodes makes the measured nugget diameter smaller. A change of the measured nugget diameter and that of the estimated nugget formation time are inversely related.

Even without the reference number setting section 8 and the number comparing section 9, the number of welding times counted by the counter section 7 and directly outputted to the output section 26 serves as a good reference for the maintenance time. In this case, the number of welding times counted by the counter section 7 may be indicated by LEDs (Light Emitting Diodes) or on a LCD (Liquid Crystal Display).

As is clear from the above, according to the present invention, the provision of the upper limit setting section 4 facilitates judgment of the maintenance time for the resetting of the welding conditions or for replacement or repairs of the electrodes. Furthermore, not only can the expulsion be avoided, but also erroneous welding can be easily detected.

In applications where an average value of a plurality of estimated nugget formation times is compared with the set reference time, the maintenance time can be easily and accurately known by outputting the comparison result.

If the comparison result of the estimated nugget formation tinge with the reference time and the comparison result of the number of welding tinges with the reference number are both outputted, the welding conditions can be made more stable.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A welder monitor for monitoring a welding quality of materials sandwiched between and welded by two electrodes, said welder monitor comprising:

a detection means for detecting a welding current flowing between the two electrodes and a welding voltage applied between the two electrodes;

an operation means for numerically analyzing, based on a heat conduction model, a temperature distribution of the two electrodes and that of the materials using the welding current and welding voltage both detected by said detection means, to thereby estimate a nugget diameter during welding;

a reference diameter setting means for setting a reference nugget diameter;

a diameter comparing means for comparing the nugget diameter during welding with the reference nugget diameter, to thereby compute a time at which the nugget diameter exceeds the reference nugget diameter;

a reference time setting means for setting a reference time shorter than a given time until which welding of intended materials is not terminated;

a time comparing means for comparing a nugget formation time, at which the nugget diameter during welding exceeds the reference nugget diameter, with the reference time set by said reference time setting means; and an output means for outputting a comparison result from said time comparing means;

whereby when the nugget formation time is shorter than the reference time, the nugget formation time is outputted to said output means.

2. A welder monitor for monitoring a welding quality of materials sandwiched between and welded by two electrodes, said welder monitor comprising:

a detection means for detecting a welding current flowing between the two electrodes and a welding voltage applied between the two electrodes;

an operation means for numerically analyzing, based on a heat conduction model, a temperature distribution of the two electrodes and that of the materials using the welding current and welding voltage both detected by said detection means, to thereby estimate a nugget diameter during welding;

a reference diameter setting means for setting a reference nugget diameter;

a diameter comparing means for comparing the nugget diameter during welding with the reference nugget diameter, to thereby compute a time at which the nugget diameter exceeds the reference nugget diameter, said diameter comparing means comprising:

a storage means for storing a plurality of times at which the nugget diameter has exceeded the reference nugget diameter; and an average value computing means for computing an average value of the plurality of times stored in said storage means;

a reference time setting means for setting a reference time;

a time comparing means for comparing the average value computed by said average value computing means with the reference time set by said reference time setting means; and an output means for outputting a comparison result from said time comparing means.

3. A welder monitor for monitoring a welding quality of materials sandwiched between and welded by two electrodes, said welder monitor comprising:

a detection means for detecting a welding current flowing between the two electrodes and a welding voltage applied between the two electrodes;

an operation means for numerically analyzing, based on a heat conduction model, a temperature distribution of the two electrodes and that of the materials using the welding current and welding voltage both detected by said detection means, to thereby estimate a nugget diameter during welding;

a reference diameter setting means for setting a reference nugget diameter;

a diameter comparing means for comparing the nugget diameter during welding with the reference nugget diameter, to thereby compute a time at which the nugget diameter exceeds the reference nugget diameter;

a counter means for counting the number of welding times; and an output means for outputting at least one of the time computed by said diameter comparing means and the number of welding times counted by said counter means.

4. The welder monitor according to claim 3, further comprising a reference number setting means for setting a reference number used for comparison with the number of welding times, and a number comparing means for comparing the number of welding times counted by said counter means with the reference number set by said reference number setting means, to thereby compute a time at which the number of welding times counted by said counter means exceeds the reference number, wherein said output means further outputs a result of computation from said number comparing means.

5. The welder monitor according to claim 3, further comprising a reference time setting means for setting a reference time and a time comparing means for comparing a nugget formation time, at which the nugget diameter during welding exceeds the reference nugget diameter, with the reference time set by said reference time setting means, wherein said output means further outputs a comparison result from said time comparing means.

* * * * *